Figure 1:
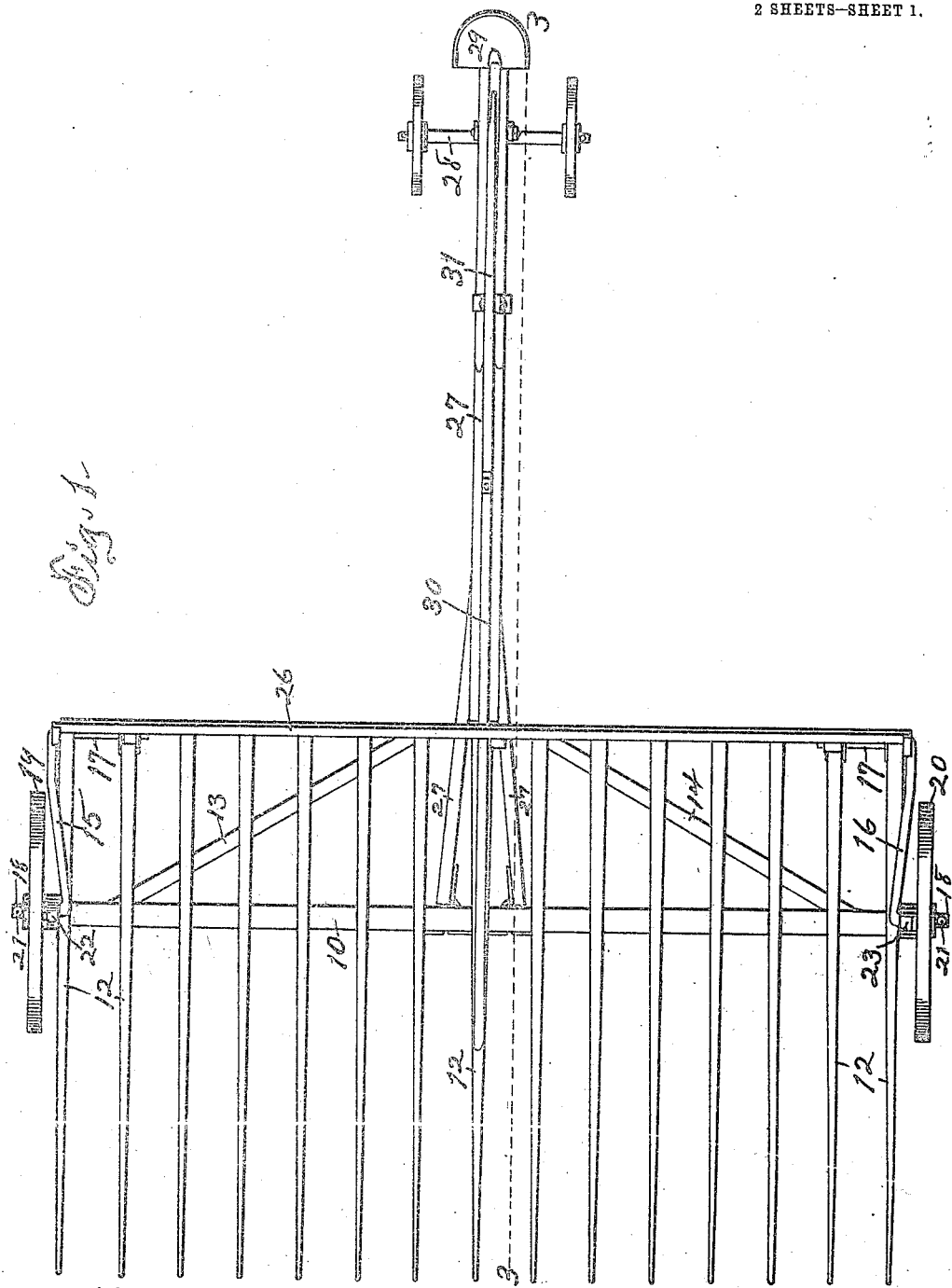

J. G. ALEXANDER.
RAKE.
APPLICATION FILED JULY 1, 1910.

994,105.

Patented June 6, 1911.
2 SHEETS—SHEET 1.

Attest:
H. G. Sweet.
V. W. Winters.

Inventor:
James G. Alexander,
By J. G. Sweet Att'y

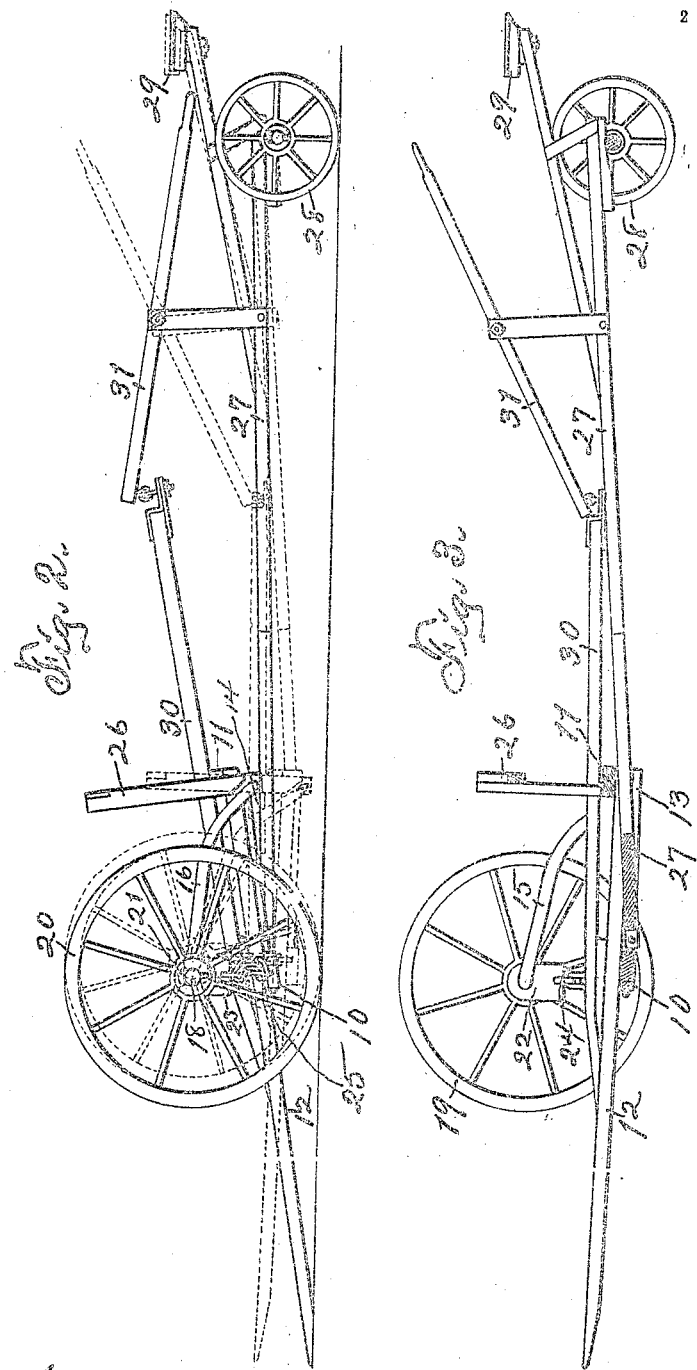

UNITED STATES PATENT OFFICE.

JAMES G. ALEXANDER, OF AMES, IOWA.

RAKE.

994,105.  Specification of Letters Patent.  Patented June 6, 1911.

Application filed July 1, 1910. Serial No. 570,017.

*To all whom it may concern:*

Be it known that I, JAMES G. ALEXANDER, citizen of the United States of America, and resident of Ames, Story county, Iowa, have invented a new and useful Rake, of which the following is a specification.

The object of this invention is to provide improved means for collecting, conveying and delivering hay and bundle grain.

A further object of this invention is to provide means for oscillating a rake relative to the axes of supporting wheels by manual actuation in one direction and by travel draft in the opposite direction.

A further object of this invention is to increase the capacity of a rake in respect of or relative to its axis of oscillation.

A further object of this invention is to provide such connection between a rake and draft devices that forward strain of the draft devices will tend to raise the rake from collecting to carrying position.

A further object of this invention is to provide means for balancing a rake in carrying position on a truck.

My invention consists in the construction, arrangement and combination of elements hereinafter set forth, pointed out in my claims and illustrated by the accompanying drawing, in which—

Figure 1 is a plan of the rake, drawing and steering mechanism being omitted, the rake proper being shown in carrying position relative to the truck. Fig. 2 is a side elevation of the rake containing the same elements as Fig. 1, the rake proper being shown by solid lines in collecting or delivering position relative to the truck and being further shown by dotted lines in carrying position. Fig. 3 is a longitudinal section on the indicated line 3—3 of Fig. 1.

In the construction of the rake as shown the numeral 10 designates a beam or crossbar which may be of any desired construction. A rake head 11 is arranged parallel with and spaced from and at the rear of the beam 10. Rake teeth 12 are arranged at right angles to and extend across the beam or cross-bar 10. The rake teeth 12 are fixed intermediate of their ends to the beam 10 and are fixed at their rear ends to the rake head 11 and said teeth have approximately two-thirds of their length in front of said beam. The teeth 12 preferably taper slightly from the rear to the front ends and are beveled at their front ends and on the lower faces thereof. Suitable braces, such as 13, 14, may be employed to further connect the beam 10, teeth 12 and rake head 11. Double crank or Z-shaped axles 15, 16 are provided and the rear arms or end portions 17 of said axles are journaled in suitable bearings on end portions of the rake head 11 and articulate on a common axis parallel with the longitudinal plane of said head. The axles 15, 16 extend upwardly and forwardly, preferably on curved lines, from the rake head 11 and also preferably are bent inwardly to overlap end portions of the beam or crossbar 10 and also to overlap the outermost teeth 12. The forward arms or end portions of the axles 15, 16 serve as spindles 18 and are mounted loosely in wheels 19, 20 and secured therein by linch-pins 21. Hangers 22, 23 are mounted loosely on and depend from the spindles 18 adjacent the inner sides of the wheels 19, 20 and chains 24, 25 are fixed to and depend from said hangers and are secured at their lower ends to end portions of the beam 10. The length of each chain 24, 25 is such that when said chains are extended they will carry the beam 10 horizontally with the teeth, rake head and load thereon at such elevation as may be most convenient in carrying hay or bundle grain from initial locations in the field to places of deposit at a stack, separator or mow. A guard 26 is mounted on and rises from the rake head 11. It is the function of the guard 26 to prevent rearward loss of any portion of the load from the rake teeth. A tongue or draft device 27 is hinged at its forward end to the central portion of the beam 10 and the rear end portion of said tongue or draft device is carried by a truck 28 and carries a seat 29 for the operator. The tongue 27 may be advanced in any desired manner such as by horses hitched thereto by swingletrees and a neck yoke in a common manner (not shown), and may be steered in any desired manner such as by oscillation of the truck 28 in a common manner on a vertical axis. A boom 30 is fixed at its forward end to a portion of the rake such as a central tooth 12 or the central portion of the beam 10 and extends rearwardly therefrom across the central portion of the rake head 11. The tongue 27 also crosses beneath and disconnected relative to said rake head 11. Operating devices, such as a lever 31, may be mounted on the rear portion of the tongue 27 and flexibly connected at one end to the rear end portion of the boom 30, the opposite end portion of said lever extending within reach of the operator on the seat 29 and susceptible of manipulation by him. Any desired means may be employed for holding the lever 31 in any desired position and as such means are common and well known and form no part of my present invention, they are not illustrated nor described.

In the practical use of my invention the machine is advanced over the surface of a field containing hay, flax or the like in windrows or bundle grain in bunches or shocks and in such advance the rake proper is inclined into the position shown by solid lines in Fig. 2, by manipulation of the actuating devices 31. In such inclining of the rake teeth the boom 30 is raised at its rear end until the beveled forward end portions of the teeth are on or near to the surface of the ground, even to the extent of raising the rake head, beam and guard until the chains 24, 25 are slackened. This is to insure the forward end portions of the teeth entering beneath the substance to be received thereby. In the further advance of the rake the substance to be loaded is received on the rake teeth, said teeth passing beneath such substance until further progress in that direction is stopped by engagement of the guard 26 with the substance and this operation is continued until a maximum load is received on the teeth and retained by the guard, and at such time it will be found that the beam 10 is located approximately centrally under the load in respect of the weight of such load. At such time as the maximum load is received the boom is released by reverse operation of the actuating devices 31 and further advance of the machine through the pushing influence of the tongue 27 acting on the central portion of the beam 10, said beam being located centrally of the load, the rake teeth, rake head and guard assuming the position shown in Figs. 1 and 3 and shown by dotted lines in Fig. 2, namely, the carrying position. The elements may be moved into the carrying position either by manipulation of the actuating devices 31 or by the automatic normal tendency of the beam, teeth, rake head and guard to assume such position under the thrust of the tongue 27. The machine is then advanced to the place of deposit with the elements in carrying position and at such place of deposit the rake proper is again tilted through manipulation of the actuating devices 31 into delivery position, which delivery position is identical with the collecting position previously described. Then the apparatus is withdrawn from the load by reverse movement which effects the withdrawal of the teeth from beneath the load.

I claim as my invention—

1. A rake comprising a beam, teeth extending across said beam, a head on said teeth parallel with and at the rear of the beam, double crank axles journaled to the head and extending to and having their spindles parallel with and in a plane above the beam, hangers on said axles flexibly carrying said beam, wheels carrying the axles, means for advancing the beam, and means for tilting the teeth, head and beam conjunctively.

2. A rake comprising a beam, teeth extending across said beam, approximately two-thirds of the lengths of said teeth being in front of said beam, a head on said teeth parallel with and at the rear of the beam, a guard carried by and rising from said head, double crank axles journaled to the head and extending to and having their spindles parallel with and in a plane above the beam, hangers pivoted on said axles and flexibly carrying said beam, wheels carrying the axles, means for advancing the beam, and means for tilting the teeth, head and beam conjunctively.

3. A rake comprising a beam, teeth crossing said beam, approximately two-thirds of the lengths of said teeth being in front of said beam, said teeth being connected on a line parallel with and at the rear of said beam, flexible and pivotal supports for and extending forwardly from said beam, wheels carrying said supports, means for advancing the beam, teeth and head, and means for tilting the same conjunctively.

4. In a rake, supporting wheels, crank axles carried by and extending rearwardly of said wheels, hangers pivoted on said axles between and contiguous to said wheels, a beam flexibly carried at its ends by said hangers in a plane parallel with and beneath the axis of the wheels, teeth crossing said beam, a head crossing and fixed to the rear ends of said teeth, the rear end portions of said crank axles being pivoted to and parallel with end portions of said head, means for advancing said beam and teeth, and means for tilting said beam and teeth in one direction.

5. In a rake, supporting wheels, crank axles carried by and extending rearwardly of said wheels, hangers pivoted on said axles between and contiguous to said wheels, a beam flexibly carried by said hangers in a plane beneath and parallel with the axis of said wheels, teeth crossing said beam, a head crossing and fixed to the rear ends of the teeth, the rear ends of the crank axles being pivoted to and parallel with end portions of said head, means pivoted to and extending rearwardly from the central portion of said beam for advancing said beam and teeth, and means for tilting said beam and teeth in one direction, the pivotal connection between the advancing means and beam being below the axis of the wheels and below the rake teeth whereby the thrust of the advancing devices is adapted to tilt the beam and teeth in the opposite direction.

6. A rake comprising supporting wheels, crank axles carried by and extending rearwardly and downwardly from said wheels, hangers pivoted on and depending from said axles between and contiguous to said wheels, chains depending from said hangers, a beam flexibly carried at its ends by said chains, said beam being located below and parallel with the axis of the wheels, teeth crossing above said beam and fixed thereto, approximately two-thirds of the lengths of said teeth being in front of said beam, a head crossing and fixed to the rear end portions of said teeth, the rear end portions of the crank axles being pivoted to and parallel with end portions of said head, a thrusting device pivoted at its forward end to the central portion of said beam and extending beneath and disconnected from the central portion of said head, said thrusting device being adapted for attachment to a prime mover, a boom fixed at its forward end to one of the teeth and extending rearwardly across and above and fixed to the central portion of said head, operating devices carried by the thrusting device and adapted for oscillation of the boom whereby in the oscillation of the boom the beam, teeth, head and devices carried thereby are oscillated conjunctively and also whereby the crank axles are oscillated in the wheels and hangers.

7. A rake comprising supporting wheels, crank axles carried by and extending rearwardly and downwardly from said wheels, hangers pivoted on and depending from said axles between and contiguous to said wheels, chains depending from said hangers, a beam flexibly carried at its ends by said chains, said beam being located below and parallel with the axis of the wheels, teeth crossing above said beam and fixed thereto, approximately two-thirds of the lengths of said teeth being in front of said beam, a head crossing and fixed to the rear end portions of said teeth, the rear end portions of the crank axles being pivoted to and parallel with end portions of said head, a guard rising from said head and extending to a greater altitude than the axis of the wheels, a thrusting device pivoted at its forward end to the central portion of said beam and extending beneath and disconnected from the central portion of said head, said thrusting device being adapted for attachment to a prime mover, a boom fixed at its forward end to one of the teeth and extending rearwardly across and above and fixed to the central portion of the head, operating devices carried by the thrusting device and adapted for oscillation of the boom whereby in the oscillation of the boom the beam, teeth, head and devices carried thereby are oscillated conjunctively and also whereby the crank axles are oscillated in the wheels and hangers.

8. A rake comprising supporting wheels, crank axles carried by and extending rearwardly and downwardly from said wheels, hangers pivoted on and depending from said axles between and contiguous to said wheels, chains depending from said hangers, a beam flexibly carried at its ends by said chains, said beam being located below and parallel with the axis of the wheels, teeth crossing above said beam and fixed thereto, approximately two-thirds of the lengths of said teeth being in front of said beam, a head crossing and fixed to the rear end portion of said teeth, the rear end portions of the crank axles being pivoted to and parallel with end portions of said head, a guard rising from said head and extending to a greater altitude than the axis of the wheels, a thrusting device pivoted at its forward end to the central portion of said beam and extending beneath and disconnected from the central portion of said head, said thrusting device being adapted for attachment to a prime mover, a boom fixed at its forward end to one of the teeth and extending rearwardly across and above and fixed to the central portion of the head, operating devices carried by the thrusting device and adapted for oscillation of the boom whereby in the oscillation of the boom the beam, teeth, head, and devices carried thereby are oscillated conjunctively and also whereby the crank axles are oscillated in the wheels and hangers, the rear end portions of the crank axles extending inwardly, the forward end portions of the crank axles extending outwardly, and the body portions of the crank axles being inclined inwardly from rear to front thereof.

Signed by me at Ames, Iowa, this 20" day of June, 1910.

JAMES G. ALEXANDER.

Witnesses:
HENRY WESTERMAN,
CLYDE L. SIVERLY.